United States Patent [19]

Wicki et al.

[11] Patent Number: 4,491,019

[45] Date of Patent: Jan. 1, 1985

[54] DETECTION OF DYNAMIC UNBALANCES OF CENTRIFUGES

[75] Inventors: Gerhard Wicki, Hünenberg; Rolf Näff, Steinhausen, both of Switzerland

[73] Assignee: Kontron Holding A.G., Zurich, Switzerland

[21] Appl. No.: 450,217

[22] Filed: Dec. 16, 1982

[30] Foreign Application Priority Data

Dec. 24, 1981 [CH] Switzerland ........................ 8284/81

[51] Int. Cl.[3] ........................ G01M 1/16; G01M 1/28

[52] U.S. Cl. ........................................ 73/457; 73/462; 494/7

[58] Field of Search ......................... 73/462, 660, 457; 338/32 H; 340/683; 494/7

[56] References Cited

U.S. PATENT DOCUMENTS 3,743,934 7/1973 Risch ............................... 73/462 X
4,028,524 6/1977 Moll et al. ........................ 73/462 X

FOREIGN PATENT DOCUMENTS 571526 2/1962 Belgium ............................... 73/462
1298343 6/1962 France .
641732 9/1948 United Kingdom .

OTHER PUBLICATIONS

Prospectus and Service Manual of Kontron's Former Ultracentrifuge Models TGA50, TGA65 and TGA75, (selected pp.), (printed Feb. 1980).

*Primary Examiner*—James J. Gill
*Attorney, Agent, or Firm*—Jon S. Saxe; Bernard S. Leon; George W. Johnston

[57] ABSTRACT

In accordance with the invention, a magnetic field sensor is disposed on a stationary part of a centrifuge near an annular member of a rotor and is adapted to detect those variations in a gap which exists between the annular member and the sensor. The variations in the gap arising from deflection and/or precession of the rotor axis.

11 Claims, 1 Drawing Figure

DETECTION OF DYNAMIC UNBALANCES OF CENTRIFUGES

BACKGROUND OF THE INVENTION

The invention relates to a contact-free system for detecting dynamic unbalance of centrifuges or the like, more particularly ultracentrifuges.

The prior art includes various systems for detecting unbalances in centrifuges and ultracentrifuges. Illustratively, conventional systems for measuring dynamic unbalance in ultracentrifuges are based upon detecting the movement of a ring surrounding the rotor shaft of the centrifuges. That is, when the rotor shaft of the centrifuge is deflected as a result of unbalance, the rotor shaft contacts a ring which extends around the shaft at a predetermined distance therefrom and rotatably mounted thereon. As a result of the contact between the ring and the shaft, the ring rotates and its movement is detected. However, this mechanical system is fairly expensive and delicate and so there remains a long-felt need for an inexpensive non-mechanical solution to the problem.

Other prior art devices detect unbalance by optical techniques. However, little progress has been made with these devices since optical sensors in the vicinity of ultracentrifuges are very easily disturbed. There remains a need for a substantially all-electronic solution to the problem of detecting the imbalance of a centrifuge, more particularly of an ultracentrifuge.

The present invention solves the problem by providing a novel system for contact-free measurement or detection of imbalance for centrifuges which system is not readily disturbed and relatively inexpensive.

SUMMARY OF THE INVENTION

In accordance with the invention, a magnetic field sensor is disposed on a stationary part of a centrifuge near an annular member of a rotor and is adapted to detect those variations in a gap which exists between the annular member and the sensor. The variations in the gap arising from deflection and/or precession of the rotor axis.

According to a feature of the invention, the rotor has a coaxially disposed lflange-like member, the sensor being disposed opposite the end face of the latter member. Preferably, the sensor is a magnetic-field-dependent resistance or a Hall generator. Preferably, the flange-like member is made of soft iron. In another preferred embodiment of the invention, the sensor is a differential sensor.

Contrary to conventional arrangements this inventive system works on a contact-free principle and is mechanically much less costly. It has the additional advantage of emitting an analog signal which is proportional to the deflection of the rotor and thus permits the sensitivity to be varied. This is an advantage for ultracentrifuges where at higher rotational speeds a less dynamic rotor unbalance can be tolerated than at low speeds. An especially preferred sensor is a differential sensor having two magnetic-field-dependent resistances and being arranged on a permanent magnet.

BRIEF DESCRIPTION OF THE DRAWING

A preferred embodiment of the invention is described hereinafter with reference to the accompanying drawing wherein.

DETAIL DESCRIPTION OF THE PREFERRED EMBODIMENT

Figure 1:
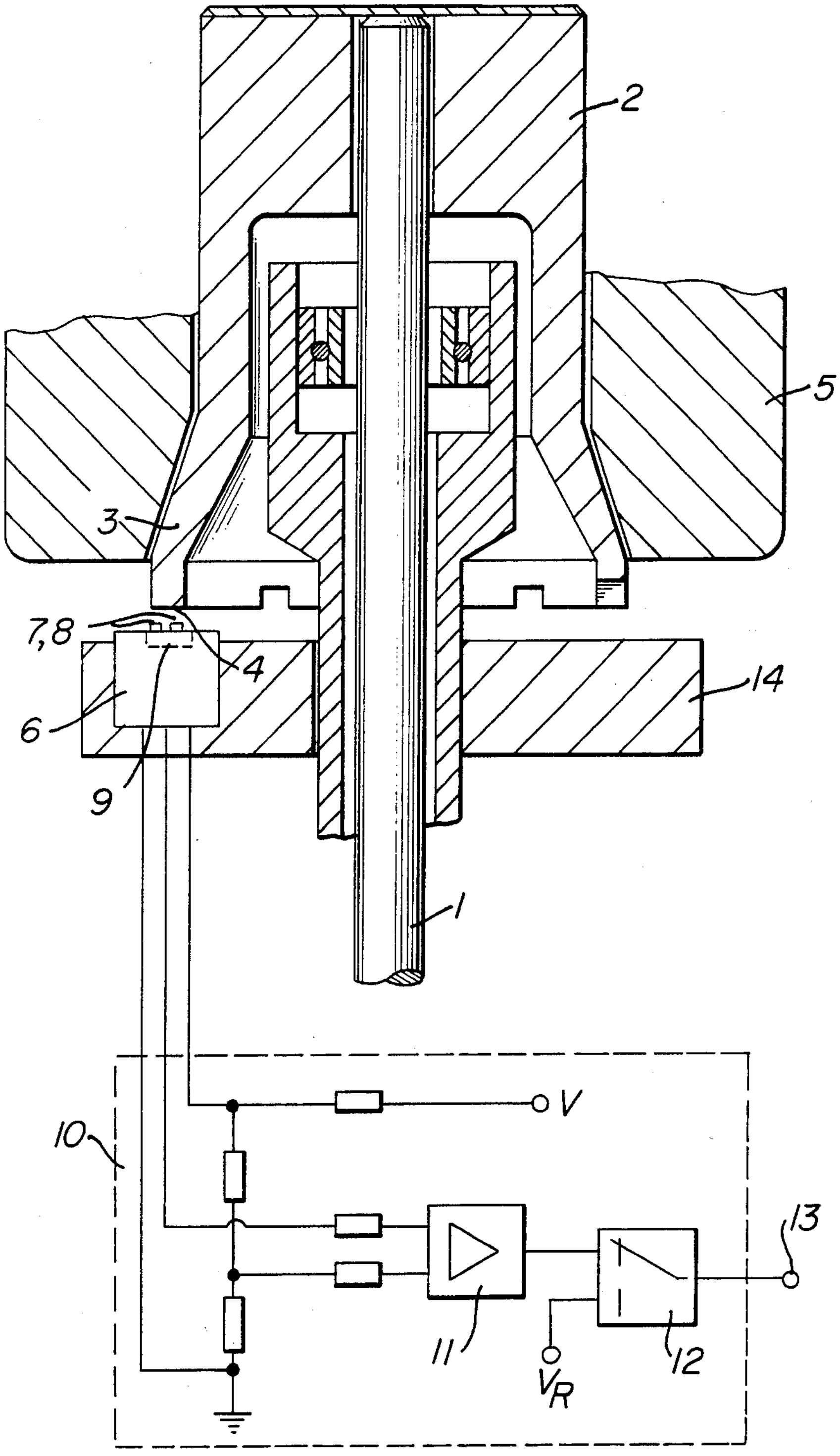
FIG. 1 is a cross-sectional view of the inventive system and its schematic circuit for detecting centrifuge unbalances.

This invention concerns an apparatus for detecting unbalance of a centrifuge or an ultracentrifuge. In the apparatus, the centrifuge has a stationary portion and a magnetic field sensor means disposed thereon. A rotatable rotor means is disposed above the stationary portion and a rotor shaft connects the rotor means with the stationary portion. An annular member is fixedly attached to the rotor means for rotation therewith. The annular member is located and disposed on the rotor means at a predetermined distance above the sensor means thereby forming a predetermined gap between the sensor means and the annular member. Electronic means detect variations in the gap arising from the deflection or precession of the rotor shaft.

FIG. 1 is a diagrammatic view of the main parts of a rotor 5 and a stationary part 14 (e.g. housing) of an ultracentrifuge incorporating the inventive system for the measurement of dynamic unbalance.

The top portion of FIG. 1 shows those parts of an ultracentrifuge which are important for the measurement of dynamic unbalance in accordance with the invention. An adapter 2 for rotor 5 is provided about a rotor shaft 1. An annular or flange-like soft iron member 3 is integrally formed on or fixedly attached to adapter 2 and will hereinafter be called a measuring flange member. Instead of being directly connected to adapter 2, measuring flange member 3 can be disposed on rotor 5 or rotor shaft 1. Measuring flange member 3 has an annular end face 4 which defines a plane perpendicular to the longitudinal axis ("shaft axis") of rotor shaft 1.

A magnetic field sensor 6 is disposed on stationary part 14 of the centrifuge and at a predetermined distance from the plane formed by annular end face 4 of measuring flange member 3. Sensor 6 is a differential sensor and comprises two magnetic-field-dependent resistances or field plates 7 and 8 secured on a common permanent magnet 9. Differential sensors of this kind are conventional and commercially available and are obtainable, for instance, from the Siemens company as type FP 210 L 100. One can also use other differential sensors embodied by magetic-field-dependent resistances, discrete field plates, arrangements of Hall generators or magnetic inductance or reluctance sensors.

In addition to the preferred embodiment of FIG. 1, measuring flange member 3 can be made of a permanent-magnet material, in which event permanent magnet 9, on which field plates 7 and 8 are disposed, is omitted or replaced by a soft iron plate.

The distance between annular end face 4 of flange member 3 and sensor 6 hereinafter referred to as the gap, is preferably between about 0.2 and about 0.7 mm. These gap values are not of course absolute limits for the operation of the invention.

Given the predetermined gap, there exists between flange member 3 and sensor 6 a predetermined constant magnetic field, leading to the two plates 7 and 8 having predetermined resistance value. In the absence of dynamic unbalance, the gap does not alter whether the rotor is static or rotating, and so the shaft axis remains stationary. If there are dynamic unbalance, however, the shaft axis moves from its balanced or normal position, with the result that the gap alters and, therefore, so does the magnetic field present therein. The change in magnetic field alters the resistance of field plates 7 and 8 and the change in the resistance then can be detected utilizing a bridge circuit 10.

Since measuring flange member 3 moves under dynamic unbalance conditions relative to sensor 6 along a plane perpendicularly to the shaft axis, the sensor is arranged so that the two field plates 7, 8 are disposed consecutively radially outward of said axis.

When rotor shaft 1 becomes skewed, rotor shaft 1 is not only deflected during centrifuging but also, because of the deflection, precesses like a toy top, so that deflection of the rotor shaft at the place where the sensor 6 is disposed alters with time and, therefore, the resistance values alter with time.

Rotor shaft 1 can become skewed because the apparatus is not positioned absolutely horizontally or because of unequal filling of the rotor.

The lower portion of FIG. 1 shows bridge circuit 10 for detecting changes in the resistance values of plates 7 and 8. Bridge circuit 10 in a known manner produces an output signal by way of an appropriate amplifier 11.

The output signal of amplifier 11 is a voltage which is proportional to the radial deflection of rotor shaft 1 along its shaft axis. It is an analog signal and, as such, the signal constitutes a substantial advantage provided by the inventive system over the prior art. The conventional systems for determining the dynamic unbalance of a centrifuge based on the previously described principle of a ring being contacted by the rotor shaft, represent digital sensors. That is, a signal is produced in response to a predetermined critical deflection which arise. There is no provision in the prior system for varying the sensitivity—i.e. the deflection response threshold particularly during operation.

The present system, with its resulting analog signal, enables gap detecting sensitivity to be varied readily even during centrifuge operation. This feature is a considerable advantage since it enables a reduced sensitivity to be selected for relatively low rotating speeds (at which it is found by experience that substantial deflections occur but, at such low speeds, do not endanger the rotor) and to select greater sensitivity for relatively high speeds once the rotor has become self-stabilized. Consequently, unlike the prior art systems which would shut down a centrifuge during low-speed deflection due to critical vibrations which would endanger the rotor at high speeds, under the present system the centrifuge can continue to operate at such low speed provided the rotor finally stabilizes itself above a critical speed.

To select gap measurement sensitivity, an amplifier 11 is utilized with a comparator 12 which receives the amplifier output signal and whose reference input can be varied in dependence upon centrifuge speed. When the measured voltage signal due to unbalances exceeds a reference voltage $V_R$, a warning signal is given at an amplifier output 13.

Alternatively, the signal available at the amplifier output 13 can be further processed by way of a microprocessor.

While the invention has been described in conjunction with a certain embodiment, it is to be understood that various modifications and changes may be made without departing from the spirit and scope of the invention.

We claim:

1. An apparatus for detecting imbalance of a centrifuge comprising:

(a) a centrifuge having:

(i) a stationary portion;

(ii) a magnetic field sensor means disposed on the stationary portion;

(iii) a rotor means disposed above said stationary portion;

(iv) a rotor shaft rotatably connecting the rotor means with the stationary portion, the rotor shaft rotating with said rotor means; and (v) an annular member fixedly attached to the rotor means for rotation therewith and having an annular end surface positioned in a plane generally perpendicular to the longitudinal axis of the rotor shaft, said annular end surface located and disposed at a predetermined distance above the sensor means thereby forming a predetermined gap between the sensor means and the annular end surface, wherein the sensor means generates a signal when the dimension of the gap between the annular end surface and sensor means is altered due to imbalance of the centrifuge; and (b) electronic circuit means for processing the signal from the sensor means so as to activate an alarm signal upon imbalance of the centrifuge.

2. The apparatus of claim 1 wherein the annular member is a coaxial flange-like member made of soft iron.

3. The apparatus of claim 2 wherein the sensor means is a magnetic-field-dependent resistance or a Hall generator.

4. The apparatus of claim 3 wherein the sensor means is a magnetic-field-dependent resistance.

5. The apparatus of claim 3 wherein the sensor means is a Hall generator.

6. The apparatus of claim 2 wherein the sensor is a differential sensor having two magnetic-field-dependent resistances disposed on a permanent magnet.

7. The apparatus of claim 1 wherein the rotor means includes a rotor.

8. The apparatus of claim 1 wherein the rotor means includes (i) a rotor disposed above the stationary portion; and (ii) an adapter having a portion disposed within the rotor for rotation therewith, and the annular member is fixedly attached to the adapter.

9. The apparatus of claim 1 wherein the rotor means includes (i) a rotor disposed above the stationary portion; and (ii) an adapter having a portion disposed within the rotor for rotation therewith, and the annular member forms an integral flange with said adapter.

10. The apparatus of claim 1 wherein the rotor means includes a rotor and the annular member is fixedly attached to the rotor for rotation therewith.

11. The apparatus of claim 1 wherein the centrifuge is an ultracentrifuge.

* * * * *